(12) United States Patent
Kraft et al.

(10) Patent No.: US 8,036,951 B2
(45) Date of Patent: Oct. 11, 2011

(54) METHOD AND SYSTEM OF PROVIDING CUSTOMIZED BUSINESS PRODUCTS TO CONSUMER AT A RETAIL LOCATION

(75) Inventors: Roger E. Kraft, Fort Scott, KS (US); William R. Russell, Pittsburg, KS (US); Rachel E. Wells, Fort Scott, KS (US)

(73) Assignee: Ward/Kraft, Inc., Fort Scott, KS (US)

( * ) Notice: Subject to any disclaimer, the term of this patent is extended or adjusted under 35 U.S.C. 154(b) by 1061 days.

(21) Appl. No.: 11/901,185

(22) Filed: Sep. 14, 2007

(65) Prior Publication Data

US 2009/0076905 A1    Mar. 19, 2009

(51) Int. Cl.
*G06Q 30/00* (2006.01)
(52) U.S. Cl. ........................................ 705/26.5
(58) Field of Classification Search .............. 705/26.61, 705/27.1, 26.5
See application file for complete search history.

(56) References Cited

U.S. PATENT DOCUMENTS

| | | | |
|---|---|---|---|
| 5,983,200 A * | 11/1999 | Slotznick | 705/26.43 |
| 6,535,294 B1 * | 3/2003 | Arledge et al. | 358/1.15 |
| 7,216,092 B1 * | 5/2007 | Weber et al. | 705/26.5 |
| 7,343,320 B1 * | 3/2008 | Treyz et al. | 705/26.5 |
| 2006/0259373 A1 * | 11/2006 | Perrier et al. | 705/26 |
| 2008/0252917 A1 * | 10/2008 | Kuroda et al. | 358/1.13 |

OTHER PUBLICATIONS

CVS to Offer Mobile Camera Phone Image Printing Business Wire, Dec. 3, 2003.*

* cited by examiner

*Primary Examiner* — Yogesh C Garg
*Assistant Examiner* — Matthew Zimmerman
(74) *Attorney, Agent, or Firm* — Lathrop & Gage LLP

(57) ABSTRACT

The present invention relates to a retailing system that provides a series of consumer products, customizable prime business communication products and a selection of ready to eat convenience food products. The retail system is provided at a fixed retail location such as a kiosk or permanent installation and may include a series of advertising panels displaying one or more products that is offered by the retail system. The retail system further includes one or more transaction points enabling a user to obtain the consumer goods, business communication products and ready to eat convenience foods.

20 Claims, 5 Drawing Sheets

METHOD AND SYSTEM OF PROVIDING CUSTOMIZED BUSINESS PRODUCTS TO CONSUMER AT A RETAIL LOCATION

CROSS-REFERENCES TO RELATED APPLICATIONS

None.

FIELD OF THE INVENTION

The present invention relates to a combination retailing system providing a series of consumer products, customizable business communication products, premium professional printing services and a selection of ready to eat convenience food products. The retail system may be provided at a fixed retail location such as a kiosk or permanent installation and may include a series of advertising panels displaying one or more products that is offered by the retail system. The retail system further includes one or more transaction points enabling a user to obtain the consumer goods, business communication products, ready to eat convenience foods as well as premium customized prime printing services and related products.

BACKGROUND OF THE INVENTION

There are currently a plethora of business communication constructions, marketing and advertising pieces and other items that are available in the market today for communicating products and services with an intended audience. Yet with this inordinately large selection of offerings and permutations, there remains a continuing need to develop new products and new and innovative mechanisms to deliver such products. The changing landscape is largely due to technological adaptation, emerging societal trends, diversification of marketing, packaging and advertising campaigns and new information handling needs of businesses and consumers alike.

The market for printed communication material is also changing and becoming more sophisticated with the customers for such products, correspondingly becoming more demanding in having the communication deliver a more impact making message to customers.

Printed products, such as communication pieces and other assemblies that are intended to be used in business communications, can be delivered in a wide variety of formats, constructions and configurations. However, the difficulty arises in maximizing the contact with each individual customer in order to try and capture repeat business opportunities with customers previously serviced by the business.

In addition to the foregoing dilemma of having to create more meaningful and impact making messages, manufacturers and suppliers of such business communication products also need new and interesting ways to connect with different market segments and obtain additional customers for their products. No longer is it sufficient for a supplier of such business communication products to simply expect product orders to be delivered to a manufacturing location.

There are a wide variety of consumer retail outlets, seasonal kiosk installations and the like. Each of these retail locations typically focus on a single product, such as beverage, convenience foods, consumer products and the like. Occasionally, retail installations may blend consumer oriented activities, such as a consumer products location offering a beverage service, e.g. coffee stand, or other consumer oriented services, namely banking or other financial services.

Many consumers today need business communication products and are often subjected to having to select from a number of pre-formatted or generic office products selections that may be available at large retail outlets. Such offerings are intended to be processed on the home office or small office printing equipment which is often limited in the print resolution.

While these products fill a viable niche in the marketplace, they are typically provided to the consumer as part of a generic stock offering, such as is commonly found in retail bins or on shelves. Such products commonly offer no professional personalization or the ability to significantly modify the format in which the products are produced. These products offer little in the way of customization or quality which means that the consumer must offer "home made" looking communication pieces to business associates and other possible professionals and potential customers which may detract from the message that a user may wish to provide. With the increase in small businesses, there is a need to obtain more sophisticated communication products without necessarily increasing the cost of obtaining such products.

What is needed therefore is a retail system in which active professionals can obtain a variety of consumer goods, ready to eat convenience foods and obtain customized business communication products and other premium printing services which heretofore were unavailable.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention is directed to a retailing system that offers a variety of consumer oriented products at a single location as well as a selection of professional, premium printed products that may be rendered in small or limited quantities. The retailing system of the present invention permits the busy professional to obtain a number of products, including food products, as well as prime business communications at a single location. The convenience of the retailing system enables the time saving creation of printed products along with other necessities that the consumer may require.

In one exemplary embodiment practiced in accordance with the presently described invention, a retail system for providing consumer goods and printed products, is provided and includes a retail location that has a series of advertising panels each of which are produced at a resolution of greater than about 150 lines per inch. The retail location includes a group of consumer goods and a catalog of available, customizable printed products. The retail system further includes at least one transaction point for completing transactions with each transaction including at least one the consumer goods and at least one of the printed products.

In a further exemplary embodiment practiced in accordance with the presently described invention, a retailing system for providing a plurality of consumer goods including ready to eat convenience food products and printed business communications, is described and includes a retail location that has a series of advertising panels which are produced at a resolution of greater than about 150 lines per inch. The retailing system includes a ready to eat convenience food delivery mechanism, and a group of consumer goods.

In the presently described embodiment, a catalog of available customizable printed business communications is also provided. The retailing system of the currently described embodiment further includes at least one transaction point for completing transactions with each of the transactions including at least one of the consumer goods, a ready to eat food product and at least one the printed business communication.

In a yet still further exemplary embodiment practiced in accordance with the presently described invention, includes a retailing system that includes a fixed retail location at which a plurality of portable consumer good products are available for purchase through a transaction. A plurality of advertising panels are presented at the retail location with each of the panels printed at a resolution of greater than about 150 lines per inch.

The presently described embodiment further includes a catalog of customizable business communication pieces, with each of the pieces having a surface that is printed at a resolution of greater than about 150 lines per inch. At least one advertising panel is provided at the retail location that includes images of at least one of the consumer goods and another advertising panel that includes an image of at least one of the business communications.

The retailing system of the presently described embodiment further includes at least one transaction point for purchasing at least one of the portable consumer goods and at least one of the business communication pieces during each transaction.

In connection with each of or any of the foregoing embodiments, the catalog of printed products includes a group including magnets, prime labels, presentation folders, business cards, post cards, mailers, business forms and combinations thereof.

The consumer goods that may be provided in connection with each of or any of the foregoing embodiments may include organic foods, ready to eat meals as well as a variety of consumer based products for home and health care.

The advertising panels of the present invention may be provided on a horizontal or vertical surface, such as floor panels or wall panels. In addition, the panels may be rendered at a resolution of greater than about 150 lines per inch, preferably greater than about 250 lines.

The transaction points that may be used with each or any of the foregoing embodiments may include touch screens, key boards, telecommunications equipment or other suitable means by which a consumer may enter transaction information.

The retailing systems of each of or any of the foregoing embodiments may also include a tutorial program to assist the user in selecting options for the consumer and for explaining the necessity of certain options in completing the type of business communication that has been selected.

These and other objects of the invention will become clear from an inspection of the detailed description of the invention and from the appended claims.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which:

FIG. 1 depicts a schematic of a retail location, such as a fixed installation store and the like;

DETAILED DESCRIPTION OF THE INVENTION

Figure 1:
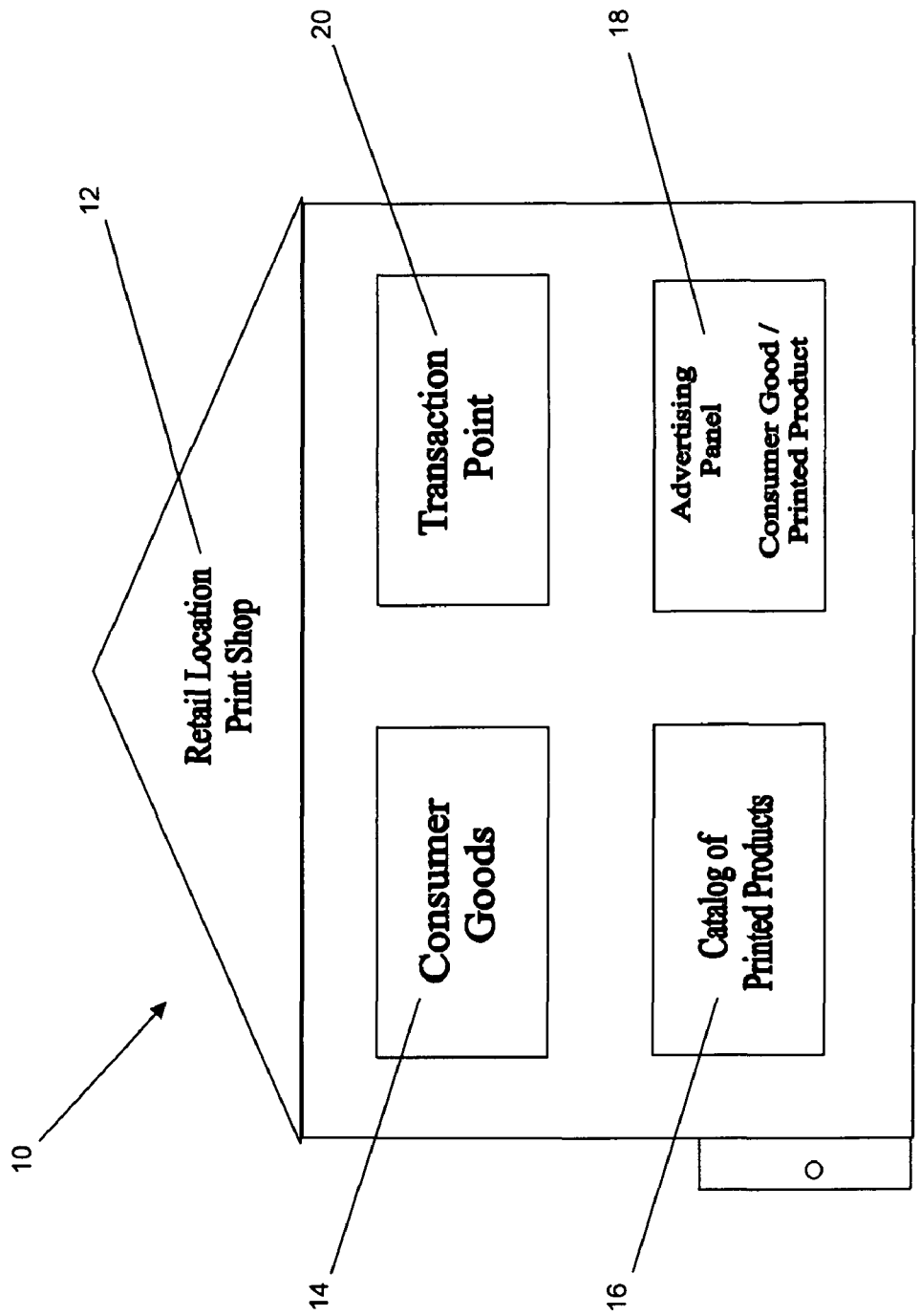

The present invention is now illustrated in greater detail by way of the following detailed description which represents the best presently known mode of carrying out the invention. However, it should be understood that this description is not to be used to limit the present invention, but rather, is provided for the purpose of illustrating the general features of the invention.

A number of terms are used in connection with describing the present invention and the following descriptions are used to illustrate but not unnecessarily limit the possible meaning of such terms.

"Prime" printed products are distinguished from other conventionally printed products in the art in that such products are known as having a high level of quality or value. The term prime is often used to describe a type of business communication that is the highest grade marketed in a particular industry. Prime printed products find application in a number of exemplary areas but have found wide range acceptance particularly in the area of consumer packaged goods ("CPG") and other products for which the prime communication is an effective means for communicating a specific message or for enhancing the image of the manufacturer or distributor or presenting the product as a high quality item. Prime printed products are also used for business communications in that they can convey certain desirable criteria, image, brand recognition or information and can be used independently of a product, such as in connection with advertising a service opportunity or offering, or with other activities or undertakings, such as non-profit organizations.

As used herein, the term "business communication piece or document" refers to a substrate that, either alone or in combination with other documents, can convey a particular message or image or provide information about a particular product or service that is available from the provider of such pieces or documents. Business communication documents or pieces can include advertising, sales and marketing collateral and such other items used to convey information on written or imaged form sheets, magnets, business cards, brochures, presentation folders, informational sheets and combinations thereof.

While use of such conventional printing technology such as flexography is desirable in the printing of films and other communication materials due to the economies that can be achieved when compared with other types of printing processes, such as lithography, there are a number of drawbacks in utilizing this process for certain applications, particularly in rending "prime" communications. Initially, the quality is limited, despite improvements in the technology to about 150 lines per inch. This can make some complicated graphics appear "grainy". Other images such as those that use flesh tones or deep or rich colors, may look faded or "washed out". The effects of this level of image resolution can detract from the product appearance which may diminish the value of the technology and the products produced. With increasing sophistication of consumers, as well as technology and expectations from each, such effects may be undesirable to potential end users.

Typically, for a point of reference, screens that have rulings of about 60 to 100 lines per inch are normally used to make halftone printed images for newspapers. Screens with about 120 to 150 lines per inch are commonly used today to produce images for magazines and commercial printing. Such screens are regularly produced by electronic dot generation.

Electronic dot generation is normally performed by computers that use unique screening algorithms in cooperation with electronic scanners and image setters to produce halftone images that are to be subsequently used to render an image. The pixels of digitized images are first assembled into dots that are then used to form shapes, sizes, rulings, etc. which create the ultimate image produced on the substrate.

An exemplary high resolution imaging device that is used in preparing the areas of the sheets that will become the prime label includes an Indigo®, available from Hewlett Packard of Palo Alto, Calif. or Karat available from KBA of Williston, Vt. The present invention seeks to provide a prime label or intermediate that has a quality of at least about 150 or more lines per inch and preferably inch and preferably more than 250 lines per inch and still preferably more than 300 lines per inch, which is approximately equal to about 2500 to 3500 dots per inch ("DPI") in order to create a high quality image that is intended to be aesthetically appealing to the consumer.

The term retail location as used in connection with the various embodiments described in connection with the present invention refers to fixed retail outlets, such as retails stores in shopping malls, "strip" retail centers and stand alone structures. Retail locations can also include kiosks and other similar structures that can be assembled inside a larger enclosure, but which still provides a functional retailing system as described in the embodiments of the present invention.

Consumer goods as used in connection with the present application include organic or whole foods, ready to eat meals and other foods, commonly known as "fast foods", household and health and beauty products, and general retailing merchandise.

Reference is now directed to FIG. 1 of one embodiment of the presently described invention, which includes a schematic of a retail location designated generally by reference to numeral 10. The retail location 10 is generally depicted as a stand alone or free standing retail structure, but may also refer to a kiosk that may be incorporated into a larger retailing location such as an enclosed shopping mall or other free standing structure.

The retail location 10 will normally have a series of walls, a floor, roof and other features commonly associated with a stand alone type of fixture. The retailing location 10 for implementing the retailing system of the various embodiments of the present invention may include advertising indicia 12 which may be carried externally of the store such as on the roof, walls and the like. The advertising indicia 12 may carry the name of the store as well as may include one or more printed panels that display products that are available at the retail location.

The retail location 10 will preferably include a series of consumer goods generally designated schematically by reference numeral 14. The consumer goods may include seasonal or regional offerings, as well as a standard selection of foods, health and beauty products and such other consumer goods as may be appropriate for the location, including ready to eat meals, take away food products and other convenience products.

The retail location 10 used with the retailing system of the present invention further includes a catalog of printed business communication products which is generally designated schematically by reference numeral 16. The catalog may be displayed electronically, such as through the use of a computer terminal or other video display or through a printed forum or media, such as advertising sheets, booklets directed to specific categories of products or combinations thereof. The catalog 16 may also include physical samples of the prime printed products that are available at the retail location. In addition, the catalog 16 would present the consumer with a listing of options available for each offering, including for example, the number of units (e.g. 1-100,000), the size, colors, font types, resolution levels, finishes and such other features as a retail location may desire or normally offer.

To aid consumers when entering the retail location 10, a series of advertising panels 18 will be presented. The panels 18 are preferably printed at a resolution quality such that a consumer can recognize the quality of printed products 18 that are available at the retail location. The panels 18 may be used to display individual items from each of the groups 14 or 16 or combinations of the groups 14 or 16. Alternatively, the panels can display a business communication that then itself shows a consumer product or service. The panels 18 may be provided on the walls, floor, ceiling or such other areas that may be seen by a prospective customer of the products or services.

A transaction point 20 will also be provided at the retail location 10. The transaction point 20 will be used by the consumers to place one or more transactions for the goods being offered at the retail location 10. The transaction point 20 can include a sales person, a video display, such as a touch screen, computer terminal, telecommunications equipment, such as a telephone or facsimile machine or combinations of any of the foregoing.

Preferably, the transaction point 20 will be used by the consumer to place an order for at least one consumer good 14 and at least one printed communication product 16. For example, a customer may order a ready to eat meal and a series of business cards, presentation folders and the like. While the customer enjoys the meal, the prime printed product order can be prepared and delivered to the customer when the customer is ready to leave the retail location 10. In this manner, the retailing system provides a convenient and efficient manner in which to provide a valuable service to the customer without delaying or interrupting the schedule of the customer.

Figure 2:
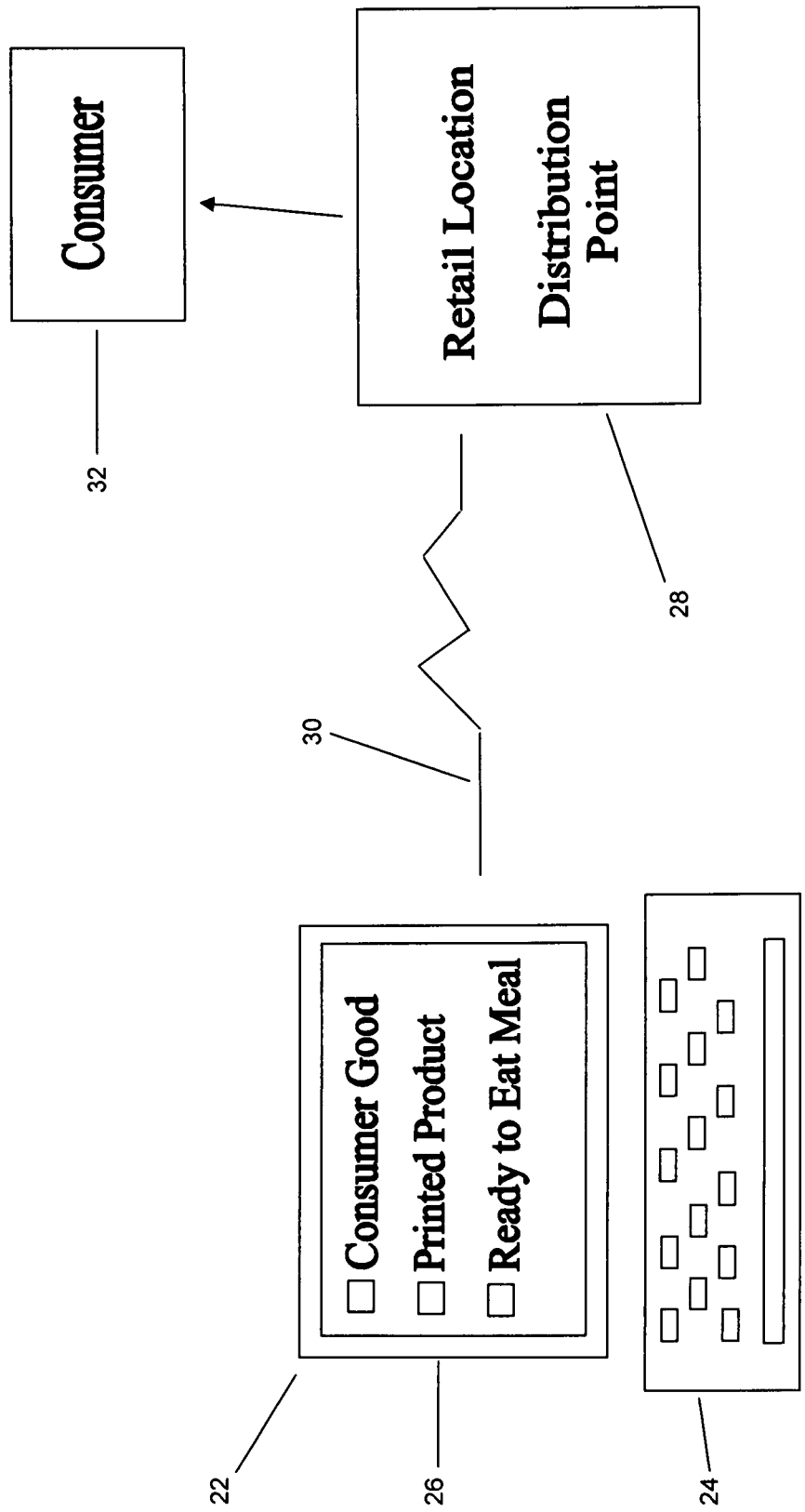
FIG. 2 provides a schematic of a system used in connection with the present invention to provide printed and consumer products to a consumer.

FIG. 2 illustrates a schematic of a transaction point 22 which is depicted as a computer terminal in the drawing. The transaction point 22 will preferably have a user interface such as a keyboard 24 as well as a video monitor 26. The monitor 26 can also be used as a touch screen type of entry point. The transaction point 22 will be located at the retail location (not shown in FIG. 2) and will preferably be a convenient and ready to use device. The user will be presented with a series of options and will be guided through such options as will be more fully discussed in connection with the description provided for FIG. 5.

The transaction point 22 is connected to the retail location and distribution point 28 by a suitable connection means 30 such as a global communications network, local area network or wide area network. The retail location and distribution point may be at a single location such as in connection with a free standing or stand alone retail location or may be in separate locations, for example with a kiosk, where the transaction point may be separate from the distribution point, but conveniently located near the kiosk location so that the consumer need not go out of his or her way in order to pick up the goods and products ordered by the consumer 32. The delivery mechanism may be any suitable means such as a conveyor system, package delivery mechanism or consumer service person.

Figure 3:
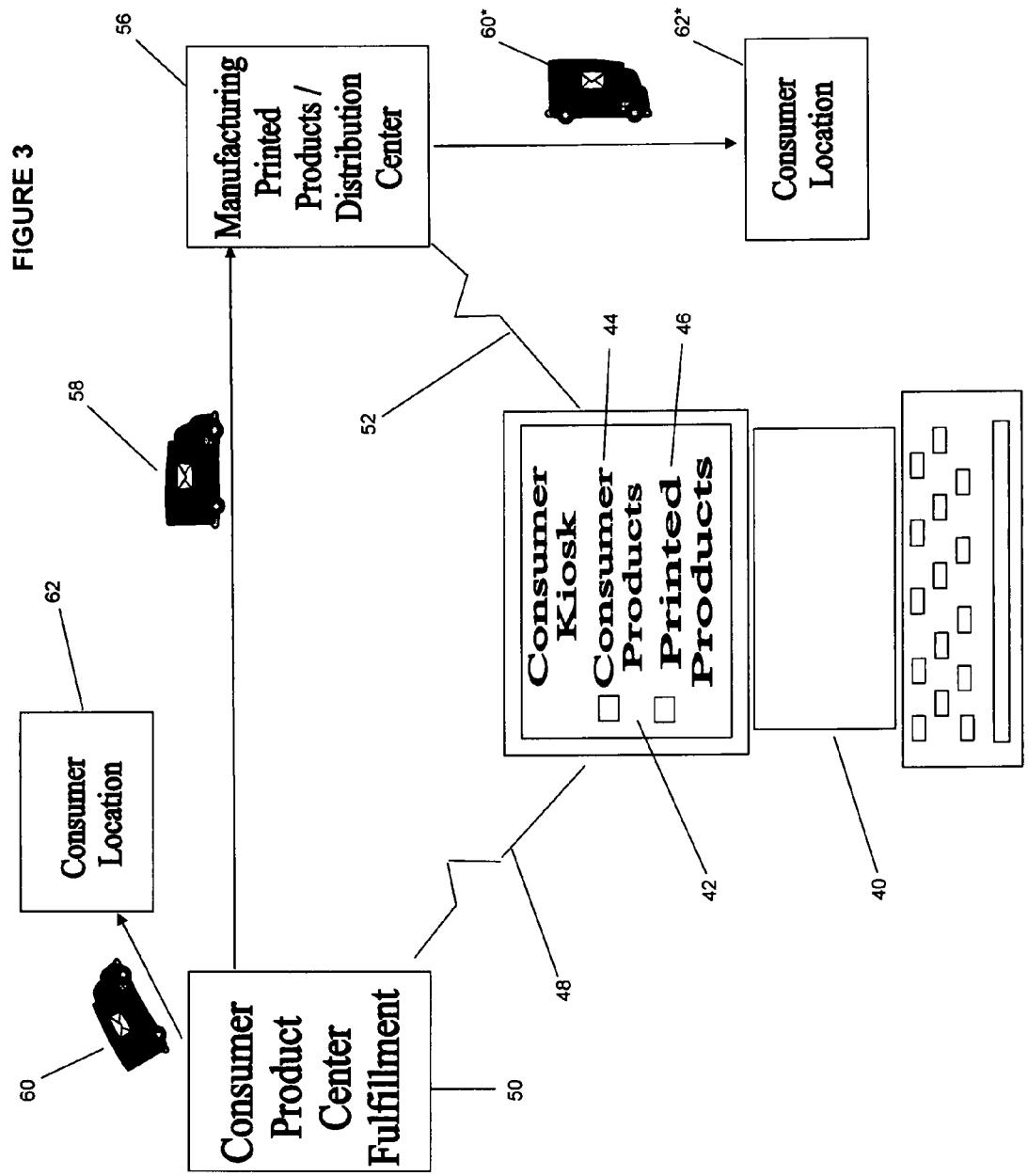
FIG. 3 shows a schematic of a kiosk based retailing system used in connection with the present invention.

FIG. 3 represents a schematic of a fulfillment system for the retailing system of the present invention. The retailing system includes a transaction point 40 which again as with FIG. 2 is depicted as a computer terminal which has a user interface such as a keyboard and a video component to allow the user to view the selections made during each transaction. An enlarged screen is presented at 42 illustrating a combination of choices that may be selected by the particular user or consumer. As shown in FIG. 3, the enlarged screen shot 42 permits the customer to select from at least a consumer products group 44 and a printed products group 46 to create a combined order that includes at least one selection from each group.

The transaction point is connected to a consumer product fulfillment center 50 via a suitable connection means 48 as described above. The transaction point is also connected to a printed products manufacturing and distribution location 56 via a suitable communication means 52. While FIG. 3 depicts the consumer product fulfillment location 50 and printed product location 56 being separate from one another, it should be understood that the two locations may be co-located and the transaction point may be located with both locations 50 and 56.

The consumer products fulfillment location 50 may deliver the consumer products to the printed products distribution center 56 via delivery means 58, which may include any suitable means, e.g. vehicles, shuttles, conveyors, pneumatic tubes or such other means as may be suitable to accomplish the delivery of the product. Alternatively, the consumer products may be delivered directly to the consumer location 62 via delivery means 60 which as discussed above may be any suitable means.

In the event the consumer products are delivered to the printed products manufacturing and distribution location 56 via delivery means 58, then the combination of products is delivered to the consumer location 62\* via suitable delivery means 60\*. Alternatively, the printed products selected by the consumer at the transaction point 40 may be delivered independently of the consumer products depending on the configuration supporting the retailing system and the type of retailing system in use at a particular location.

The printed business communication products and/or customized printed products are preferably provided or produced at a relatively high resolution of imaging, such as greater than 150 lines per inch, and preferably greater than about 250 lines per inch.

Figure 4:
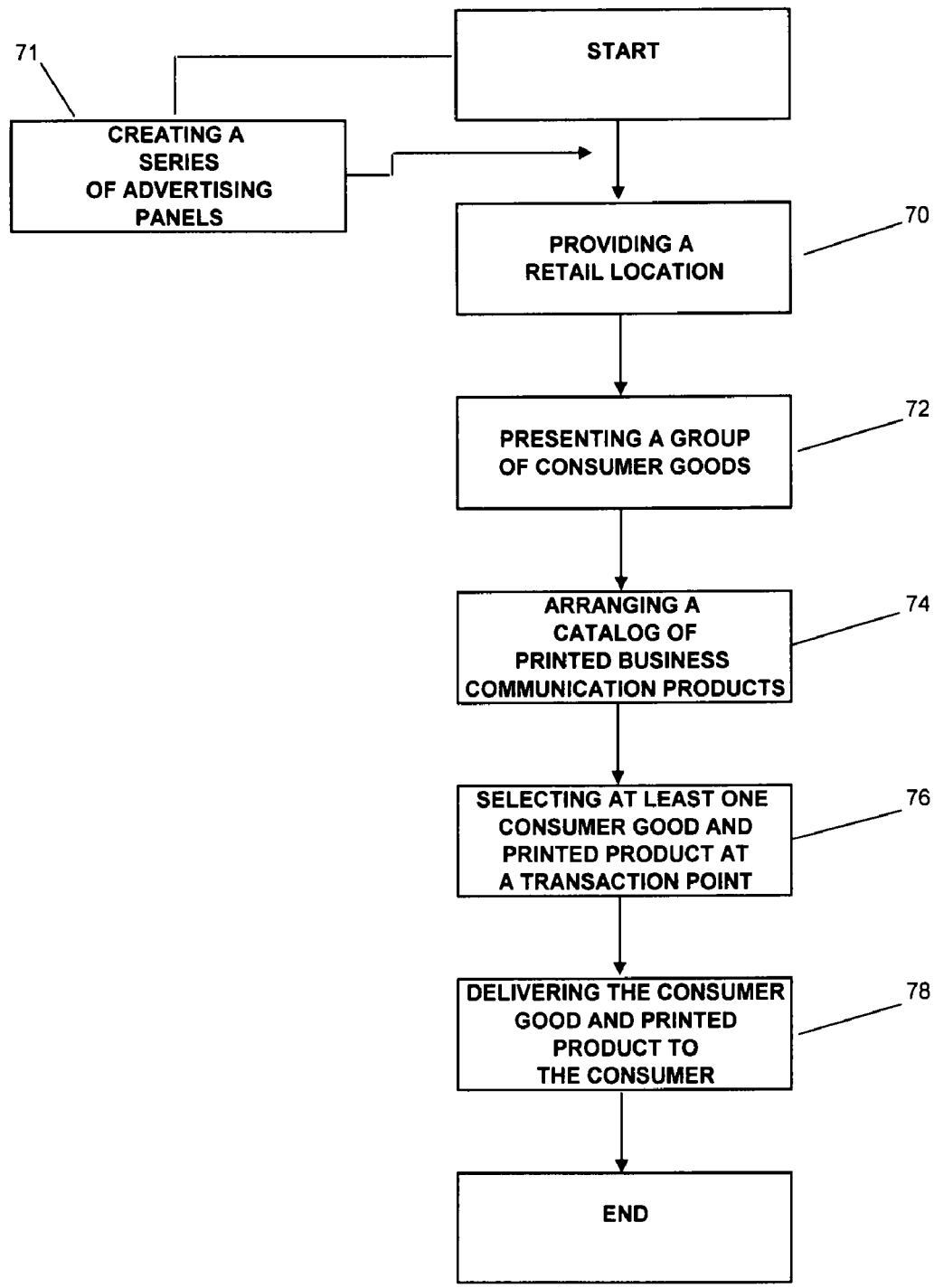
FIG. 4 illustrates an exemplary method of using the retailing system provided in accordance with the present invention.

Reference is now directed to FIG. 4 of the presently described invention in which a block diagram is presented illustrating a series of exemplary steps in carrying out an embodiment of the invention. The process of utilizing the system is started by providing a retail location at step 70. As indicated previously, the retail location may include a free standing or stand alone retail store or kiosk that may be contained within a larger structure. Next, at step 72 a series of consumer products is collected for presentation to a consumer such as through use of a video display monitor allowing a customer to select from a number of available options.

At step 74, a catalog of available printed business communication products is arranged, such as by categories of offerings. Exemplary business communication products that may be offered in connection with the catalog include but are not limited to magnets, prime labels, presentation folders, business cards, post cards, mailers, business forms and combinations thereof.

At step 76, the consumer or user of the retailing system selects at least one consumer good and at least one printed product provided by the collection assembly at step 72 and the catalog arranged at step 74. Selection of the combination of offerings will be accomplished through a suitable user interface which will permit the user the ability to easily navigate the system to obtain the preferred choices of products. Once the selection of the combination has been made at step 76, the products are then delivered to the consumer at step 78. Delivery may occur such as presentation at the transaction point, e.g. a sales counter or other pick up location designated at the retail location.

In addition to the foregoing steps, a series of advertising panels may be created at step 71 which depicts at least one of the consumer products and at least one of the printed products that are available from the retailing system. Such panels, may aid the consumer in making the selection of product combinations that are available at the retail location and will preferably provide the user with an idea of what the product offerings will look like. For example, the advertising panels may each be printed at a resolution of greater than about 150 lines per inch so that the consumer can see the type of printing quality that is available through the particular retailing system in use at the retail location.

Once the delivery has been accomplished at step 78, the first transaction ends such as through the payment for product orders. The transaction point is then available for another user to enter his or her particular selections and the process is commenced again to fulfill the next order.

Figure 5:
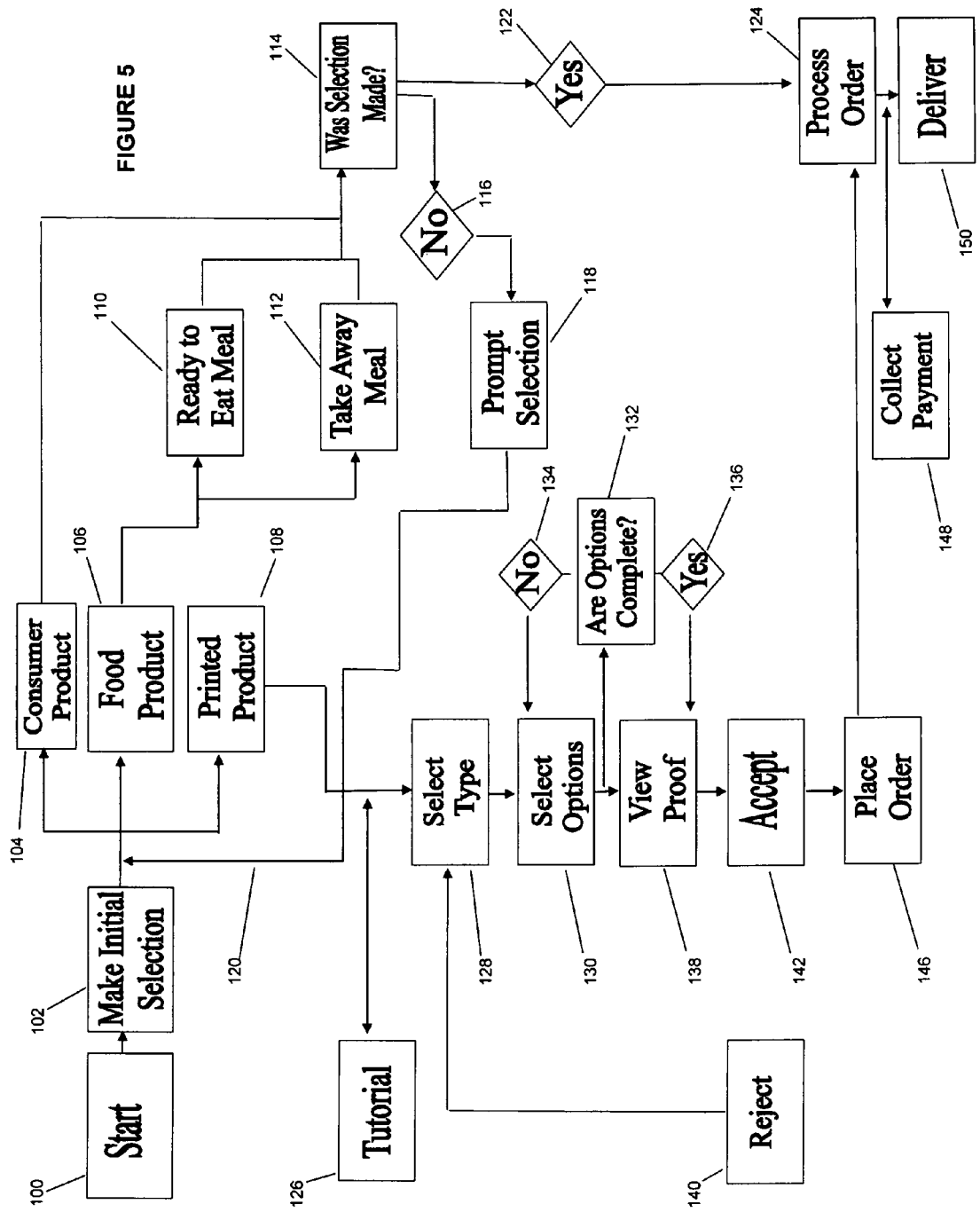
FIG. 5 depicts a representative flow diagram as may be practiced in accordance with the present invention.

Turning now to FIG. 5, a flow diagram is provided which provides an illustrative example of how the retailing system functions to deliver a combination of products to the end user.

The process is started at 100 such as through a user activating a transaction point such as by striking a key or touching a display screen. The user of the system is prompted to make a selection at 102 which will include a series of options, including at least a grouping of consumer products 104, food products 106 and printed business communication products 108.

The user at the transaction point will be required to make a selection from at least two of the groups presented, for example, one consumer product and one printed business communication product or one food product and one printed business communication product. The selection of food products from group 106 may also include additional selections such as whether the food product is a ready to eat meal 110 or a take away food product 112. The system will then determine whether a selection of at least one consumer product or food product was entered at 114. If the system determines that no selection was made at 116, then the system will prompt the user at 118 to enter a selection and the system reroutes the user back to the entry menu at 120.

If the system detects that a selection was made at 122, the order is then further advanced to the process order sequence at 124. The order will be held at the process order sequence until the remainder of the order has been completed.

The user will also be prompted to enter an order for at least one printed business communication product from group 108. The system will then advance the order through a series of additional processing sequences to help the consumer complete the necessary instructions. The system may also provide the user with a tutorial at 126 to further explain the options that the user must select and the rationale for each selection. The user may return to the tutorial option at any time during the sequence to aid in the further selection and of the business communication product or customization of the printed products.

The user is prompted to select the type of customized printed product or business communication product at 128. The product collection may include but is not limited to magnets, prime labels, presentation folders, business cards, post cards, mailers, business forms and combinations thereof. Once the type of product has been selected, the user is presented with a number of additional options to select from at step 130.

The additional options available at step 130 may include but are not limited to font type and size, colors, finishes (e.g. glossy, flat, etc.), perforation and fold lines, quantities and such other options as may be relevant to the particular product selected. For example, if the selection is a label product, the user may also select the type of adhesive, permanent, removable, repositionable, etc.

Once the options have been entered by the user, the system at 132 will compare the options with the type of printed product and capabilities of the manufacturing equipment to make sure that the product can be produced. If the system determines that the options will not work at 134, then the user will be prompted to select or deselect options and be offered to return to the tutorial 126 in order to understand the errors that were made in putting together the order. If the options are determined to be complete at step 136, then the system will present a proof at 138 so that the user can accept or reject the product configuration. If the user rejects that proof at 140, the user is returned to the selection menus to again reconfigure the printed communication product.

If the user accepts the proof at 142, then the portion of the order relating to the printed product is sequenced and placed in the queue at 146. The printed product order (business communication and/or customized printed product) is then combined with that portion of the consumer product selection at 124. The consumer is then prompted to make the payment at 148, such as by swiping a credit card or gift card, entering information relating to a deposit account or if a sales person is present the user or customer may pay with cash or a check. Once payment has been received, the order, consisting of at least one business communication or customized printed product is delivered along with the at least one consumer product at 150.

It will thus be seen according to the present invention a highly advantageous retailing system for providing a combination of consumer goods and printed products has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

The invention claimed is:

1. A method for providing business products:
   providing a series of advertising panels at a retail location, wherein the advertising panels include advertisements for customized printed business products and are created having a resolution greater than 150 lines per inch;
   by a transaction point computer at the retail location:
   receiving a selection of a food product for consumption by a consumer at the retail location;
   receiving a selection of a type of business product from a group of business products and receiving a selection of additional options customizing the selected type of business product;
   determining whether a customized business product can be produced according to the selected type of business product, the selected additional options, and capabilities of an equipment used for manufacturing the business product;
   if the customized business product can be produced then presenting a proof of the customized business product and if the customized business product can not be produced then presenting a prompt for modification of the customized business product and a tutorial explaining errors made in the selections;
   delivering the food product and customized business product to the consumer at the retail location, wherein the food product is delivered prior to delivery of the customized business product.

2. The method of claim 1, wherein the food product is an organic food product.

3. The method of claim 1, wherein said advertising panels are provided on at least one of a vertical or horizontal surface of said retail location.

4. The method of claim 1, wherein the tutorial further includes information for creating customized printed products.

5. The method of claim 1, wherein the group of business products includes magnets, prime labels, presentation folders, business cards, post cards, mailers, business forms, or combinations thereof.

6. The method of claim 1, wherein the customized business product is produced at a resolution of greater than 150 lines per inch.

7. The method of claim 1, wherein said retail location is a kiosk.

8. The method of claim 1, wherein said retail location is a permanently fixed retail outlet.

9. The method of claim 1, wherein said transaction point computer includes a human interface.

10. The method of claim 9, wherein said human interface is a keyboard.

11. A retail system for providing business products, comprising:
   a series of advertising panels at a retail location, wherein the advertising panels include advertisements for customized business products and have a resolution greater than 150 lines per inch;
   a transaction point computer at the retail location configured to:
   receive a selection of a food product for consumption by a consumer at the retail location;
   receive a selection of a type of business product from a group of business products and receive a selection of additional options customizing the selected type of business product;
   determine whether a customized business product can be produced according to the selected type of business product, the selected additional options, and capabilities of an equipment used for manufacturing the business product;
   if the customized business product can be produced then present a proof of the customized business product and if the customized business product can not be produced then present a prompt for modification of the customized business product and a tutorial explaining errors made in the selections;

a mechanical delivery mechanism for delivering the food product and customized business product to the consumer at the retail location, wherein the food product is delivered prior to delivery of the customized business product.

12. The system of claim 11, wherein the food product is an organic food product.

13. The system of claim 11, wherein said advertising panels are provided on at least one of a vertical or horizontal surface of said retail location.

14. The system of claim 11, wherein the tutorial further includes information for creating customized printed products.

15. The system of claim 11, wherein the group of business products includes magnets, prime labels, presentation folders, business cards, post cards, mailers, business forms, or combinations thereof.

16. The system of claim 11, wherein the customized business product is produced at a resolution of greater than 150 lines per inch.

17. The system of claim 11, wherein said retail location is a kiosk.

18. The system of claim 11, wherein said retail location is a permanently fixed retail outlet.

19. The system of claim 11, wherein said transaction point computer includes a human interface.

20. The system of claim 19, wherein said human interface is a keyboard.

* * * * *